(12) United States Patent
Wang et al.

(10) Patent No.: US 12,207,249 B2
(45) Date of Patent: Jan. 21, 2025

(54) TECHNIQUES FOR WIRELESS COMMUNICATIONS USING FIXED TRANSPORT BLOCK SIZE

(71) Applicant: QUALCOMM Incorporated, San Diego, CA (US)

(72) Inventors: Xiaojie Wang, Hillsborough, NJ (US); Jing Sun, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 17/652,638

(22) Filed: Feb. 25, 2022

(65) Prior Publication Data

US 2023/0300821 A1    Sep. 21, 2023

(51) Int. Cl.
*H04W 72/1263* (2023.01)
*H04L 1/00* (2006.01)
*H04W 72/02* (2009.01)
*H04W 72/21* (2023.01)

(52) U.S. Cl.
CPC ....... *H04W 72/1263* (2013.01); *H04L 1/0003* (2013.01); *H04L 1/0008* (2013.01); *H04L 1/0063* (2013.01); *H04W 72/02* (2013.01); *H04W 72/21* (2023.01)

(58) Field of Classification Search
CPC . H04W 72/1263; H04W 72/02; H04W 72/21; H04L 1/0003; H04L 1/0008; H04L 1/0063
See application file for complete search history.

(56) References Cited

U.S. PATENT DOCUMENTS

| | | | |
|---|---|---|---|
| 2019/0045390 A1* | 2/2019 | Davydov | H04W 28/10 |
| 2021/0194652 A1* | 6/2021 | Khoryaev | H04L 5/0048 |
| 2021/0400448 A1* | 12/2021 | Adjakple | H04W 4/40 |
| 2022/0150000 A1* | 5/2022 | Liu | H04L 1/1864 |

* cited by examiner

*Primary Examiner* — Basil Ma
(74) *Attorney, Agent, or Firm* — Arent Fox, LLP / Qualcomm

(57) ABSTRACT

Some aspects described herein relate to transmitting, to a receiving user equipment (UE), an indication of a fixed size transport block size (TBS) used for a sidelink transmission, and transmitting, to the receiving UE and based at least in part on the fixed size TBS, the sidelink transmission over sidelink resources. Other aspects relate to the receiving UE receiving the indication and the sidelink transmission. Additional aspects relate to a base station for configuring the sidelink resources for fixed size TBS.

30 Claims, 9 Drawing Sheets

TECHNIQUES FOR WIRELESS COMMUNICATIONS USING FIXED TRANSPORT BLOCK SIZE

BACKGROUND

Aspects of the present disclosure relate generally to wireless communication systems, and more particularly, to communicating based on a transport block size (TBS).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus is provided that includes a transceiver, a memory configured to store instructions, and one or more processors communicatively coupled with the memory and the transceiver. The one or more processors are configured to execute the instructions to cause the apparatus to transmit, to a receiving user equipment (UE), an indication of a fixed size transport block size (TBS) used for a sidelink transmission, and transmit, to the receiving UE and based at least in part on the fixed size TBS, the sidelink transmission over sidelink resources.

In another aspect, an apparatus is provided that includes a transceiver, a memory configured to store instructions, and one or more processors communicatively coupled with the memory and the transceiver. The one or more processors are configured to receive, from a transmitting UE, an indication of a fixed size TBS used for a sidelink transmission, receive, from the transmitting UE, the sidelink transmission over sidelink resources, and process, based at least in part on the fixed size TBS, the sidelink transmission to obtain data transmitted in the sidelink transmission.

In another aspect, an apparatus is provided that includes a transceiver, a memory configured to store instructions, and one or more processors communicatively coupled with the memory and the transceiver. The one or more processors are configured to receive an indication of a transmitting UE using a fixed size TBS for a sidelink transmission to a receiving UE, and schedule, for the transmitting UE, sidelink resources for the sidelink transmission based at least in part on the indication of using the fixed size TBS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
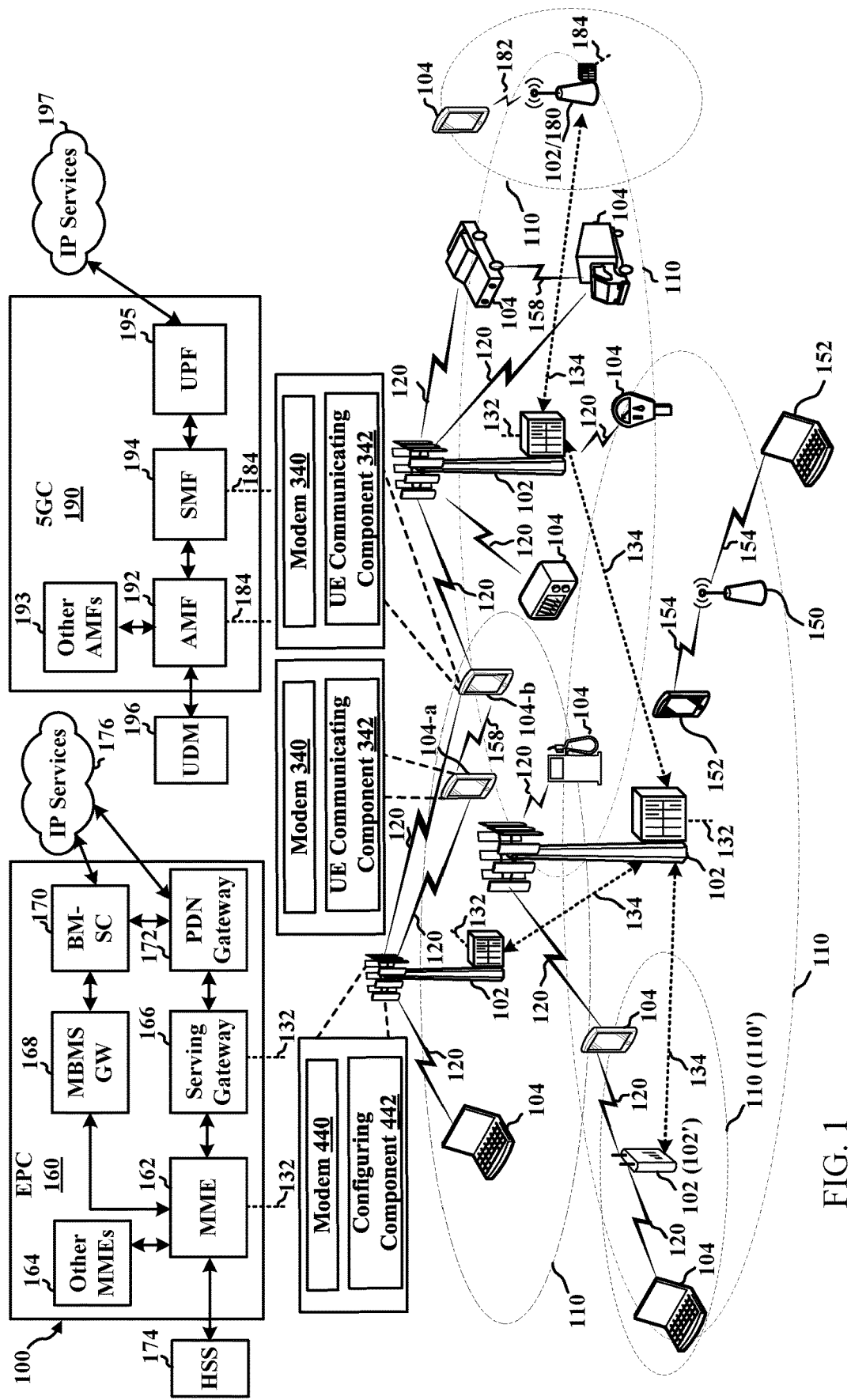
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to using a fixed transport block size (TBS) for certain wireless communications to promote low latency and/or resource conservation at least in part by mitigating packet segmentation and/or padding. In some wireless communication technologies, such as fourth generation (4G) long term evolution (LTE), devices can calculate or determine TBS based on a table that is a function of modulation and coding scheme (MCS) used for communication and a number of allocated resources (e.g., a number of resource blocks (RBs) or other measure of time and frequency resources). In fifth generation (5G) new radio (NR), for example, devices can use a formula combined with a table for small TBS to calculate or determine TBS. For example, the devices can use the same process for TBS determination for uplink channels (e.g., physical uplink shared channel (PUSCH)) and downlink channels (e.g., physical downlink shared channel (PDSCH)).

In 5G NR, for example, a user equipment (UE) can calculate TBS by computing the number of resource elements (REs) allocated per RB:

$$N'_{RE} = 12 \times N^{sh}_{sym} - N^{PRB}_{DMRS} - N^{PRB}_{oh}$$

where $N_{sym}^{sh}$ is number of symbols allocated to UE, $N_{DMRS}^{PRB}$ is demodulation reference signal (DMRS) overhead per physical resource block (PRB), $N_{oh}^{PRB}$ is other overhead per PRB for e.g., channel state information reference signal (CSI-RS). Then, the UE can calculate $N_{RE}$ by multiplying $N'_{RE}$ with the number of allocated RBs. Subsequently, UE can calculate an intermediate number of information size:

$$N_{info} = N_{RE} \times \text{Modulation Order} \times \text{Target Code Rate} \times \text{\# layers}$$

The UE may apply a TBS scaling factor based on an indication from a base station (e.g., gNB), and then can determine the TBS using a decision process that is based on $N_{info}$.

In 5G NR, for example, the UE can use a similar process for calculating TBS for sidelink communications in both Mode 1 sidelink resource allocation, where the gNB assigns the sidelink resources, and Mode 2 sidelink resource allocation, where the UE can schedule itself with resources from a resource pool based on channel sensing. In these examples, the UE can also consider sidelink control information (SCI) payload size (e.g., for a first stage SCI (SCI-1) and for a second stage SCI (SCI-2), etc.). For example, the UE can transmit SCI-1 before SCI-2, and the receiving UE can use the fields in SCI-1 to determine one or more parameters for receiving and/or processing SCI-2. In this example, the UE can use a modified calculation for the number of REs:

$$N'_{RE} = 12 \times (N^{sh}_{symb} - N^{PSFCH}_{symb}) - N^{PRB}_{oh} - N^{DMRS}_{RE}$$

where $N_{symb}^{sh} = \text{sl-LengthSymbol} - 2$, $N_{symb}^{PSFCH} = 3$. The modified calculation can also consider SCI-1 and SCI-2 payload, such that:

$$N_{RE} = N'_{RE} \cdot n_{PRB} - N^{SCI,1}_{RE} - N^{SCI,2}_{RE}$$

In some examples, such as for industrial Internet-of-Things (IIoT) use cases or cases where packets have a consistent size, the to be transmitted packets can typically be of fixed sizes that may be pre-configured before transmission. In this example for deterministic and fixed packet sizes with tight latency requirement, fixed size TBS can be used. For example, a fixed size TBS can include a TBS that is pre-configured or otherwise determined by a device independent of resource allocation size, modulation and coding scheme (MCS), etc. for transport blocks to be communicated. For example, when a UE calculates a TBS as described above, segmentation of the packet may occur which can incur additional latency, and/or padding extra bits to fill the packet size into another TBS may compromise reliability and/or waste resources. For example, TBS determination based on MCS and number of REs, as in current NR sidelink, can cause packet segmentation and padding, which may not be suitable for IIoT with fixed TBS and tight latency requirement. Accordingly, where fixed size TBS can be used (e.g., in cases of deterministic and/or fixed packet sizes), devices can communicate using fixed size TBS without having to compute or determine the TBS for the given transmission. This may be enabled by a UE indicating the fixed size TBS or related parameters in sidelink signaling or signaling for configuring sidelink communications. In one specific example, the transmitting UE can signal the fixed size TBSs to the receiving UE for one or more IIoT packet sizes, and the receiving UE can accordingly use the fixed size TBSs for receiving or processing received transmissions from the transmitting UE.

For example, using fixed size TBSs, in this regard, can avoid transport block (TB) segmentation for reduced latency and reduced upper layer assembly complexity of packets or corresponding data units. In addition, for example, using fixed size TBSs can avoid TB padding for increased communication reliability. In Mode 1 sidelink resource allocation, for example, the resource allocation from a gNB can be based on a rough estimate due to lack of sidelink CSI. In this example, using fixed size TBS can facilitate physical sidelink shared channel (PSSCH) preparation time. In Mode 2 sidelink resource allocation, for example, channel sensing may not always guarantee resource availability. In this example, using fixed size TBS may reduce sensing latency, e.g., by avoiding repeating sensing if not enough resources available. Moreover, for example, using fixed size TBS can similarly improve communications in configurations that use semi-persistent scheduling (SPS) resources, configured grant (CG), NR-unlicensed (NR-U) Autonomous uplink (UL) (AUL), etc., by providing predictability to the TBS. The above benefits may enhance the efficiency and quality of wireless communications, particularly in IIoT or other environments having tight latency and/or quality requirements.

The described features will be presented in more detail below with reference to FIGS. 1-9.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and a UE communicating component 342 for communicating using a fixed size TBS, as described further herein. In addition, some nodes may have a modem 440 and configuring component 442 for configuring UEs to communicating using a fixed size TBS, as described herein. Though UE 104-a and UE 104-b are shown as having the modem 340 and UE communicating component 342 and a base station 102 is shown as having the modem 440 and configuring component 442, this is one illustrative example, and substantially any node or type of node may include a modem 340 and UE communicating component 342, and/or a modem 440 and configuring component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs (e.g., UE 104-a and 104-b) may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. In addition, in this regard, UEs 104-a, 104-b can use a portion of frequency in the 5 GHz unlicensed frequency spectrum in communicating with the small cell 102', with other cells, with one another using sidelink communications, etc. The UEs 104-a, 104-b, small cell 102', other cells, etc. can use other unlicensed frequency spectrums as well, such as a portion of frequency in the 60 GHz unlicensed frequency spectrum.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172.

The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include machine type communications (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, in a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.), including base station 102 described above and further herein, may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as virtually distributing functionality for at least one unit, which can enable flexibility in network design. The various units of the disaggregated base station, or disaggregated RAN architecture, can be configured for wired or wireless communication with at least one other unit.

In an example, UE communicating component 342 of a first UE (e.g., UE 104-*a*, which can be a transmitting UE in sidelink communications) can obtain or otherwise use a fixed size TBS for communicating with a second UE (e.g., UE 104-*b*, which can be a receiving UE in sidelink communications). In an example, UE communicating component 342 of the second UE (e.g., UE 104-*b*) can receive and process sidelink communications from the first UE (e.g., UE 104-*a*) based on the fixed size TBS, as described herein. Using fixed size TBS can be provide various benefits in certain scenarios, such as in communications among IIoT devices, as described herein. In one example, such as in Mode 1 sidelink resource allocation, the base station 102 can assist with resource allocations, and configuring component 442 may in some cases assist in allocating or scheduling sidelink resources for the first UE (e.g., UE 104-*a*) and/or the second UE (e.g., UE 104-*b*) based on the fixed size TBS, and/or may configure the fixed size TBSs that the UEs can use for sidelink communications.

Figure 2:
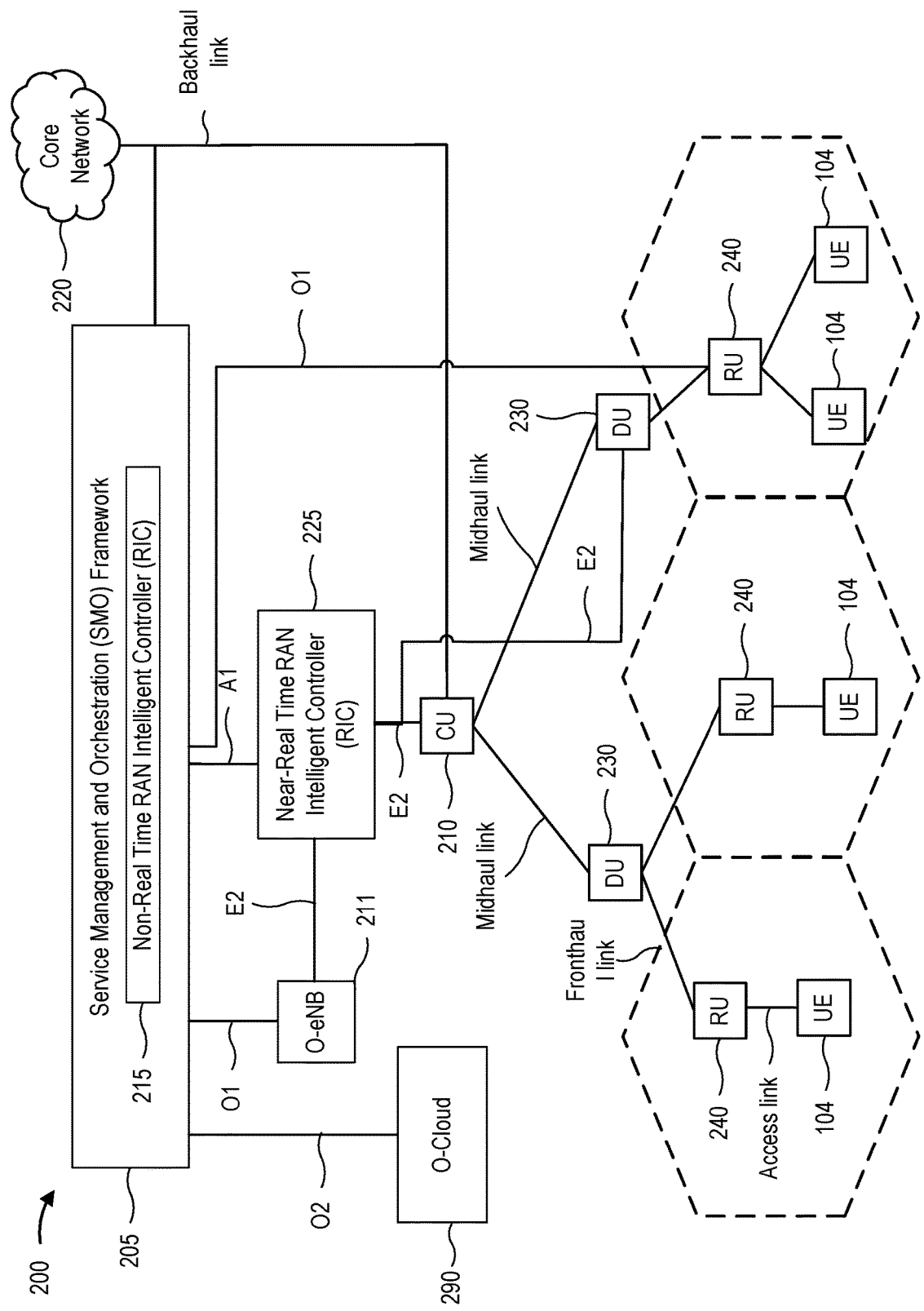
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Turning now to FIGS. 3-9, aspects are depicted with reference to one or more components and one or more methods that may perform the actions or operations described herein, where aspects in dashed line may be optional. Although the operations described below in FIGS. 5-8 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
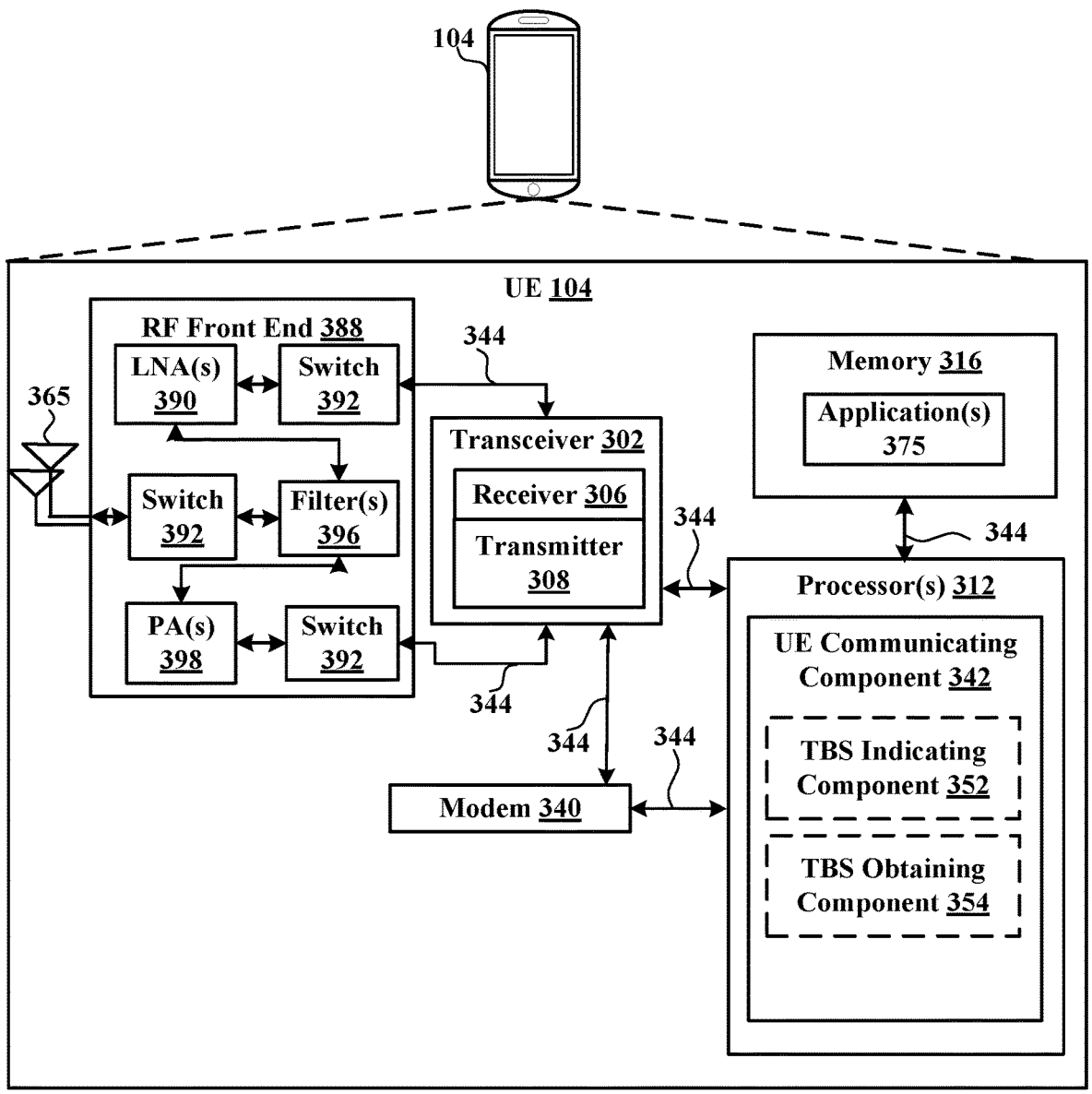
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for communicating using fixed size TBS, as described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware and/or software executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102 or a SL transmitting UE. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware and/or software executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, receiving wireless communications transmitted by at least one base station 102 or a SL transmitting UE, transmitting wireless communications to at least one base station 102 or a SL receiving UE, etc. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102, one or more other UEs in SL communications, etc. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a TBS indicating component 352 for indicating a fixed size TBS for a receiving UE to use in sidelink communications, and/or a TBS obtaining component 354 for obtaining, from a transmitting UE, a fixed size TBS to use in sidelink communications, in accordance with aspects described herein. In an example, UE 104 can use the TBS indicating component 352 where the UE 104 is a transmitting UE or the TBS obtaining component 354 where the UE is a receiving UE. In some examples, the UE communicating component 342 can be configured to perform one or more of the other functions described herein for the transmitting UE, such as transmitting sidelink communications according to the fixed size TBS, obtaining configuration information from the base station in Mode 1 sidelink resource allocation, etc. In addition, in some examples, the UE communicating component 342 can additionally or alternatively be configured to perform one or more of the other functions described herein for the receiving UE, such as receiving and processing sidelink communications according to the fixed size TBS, etc.

In an aspect, the processor(s) 312 may correspond to one or more of the processors described in connection with the UE in FIG. 9. Similarly, the memory 316 may correspond to the memory described in connection with the UE in FIG. 9.

Figure 4:
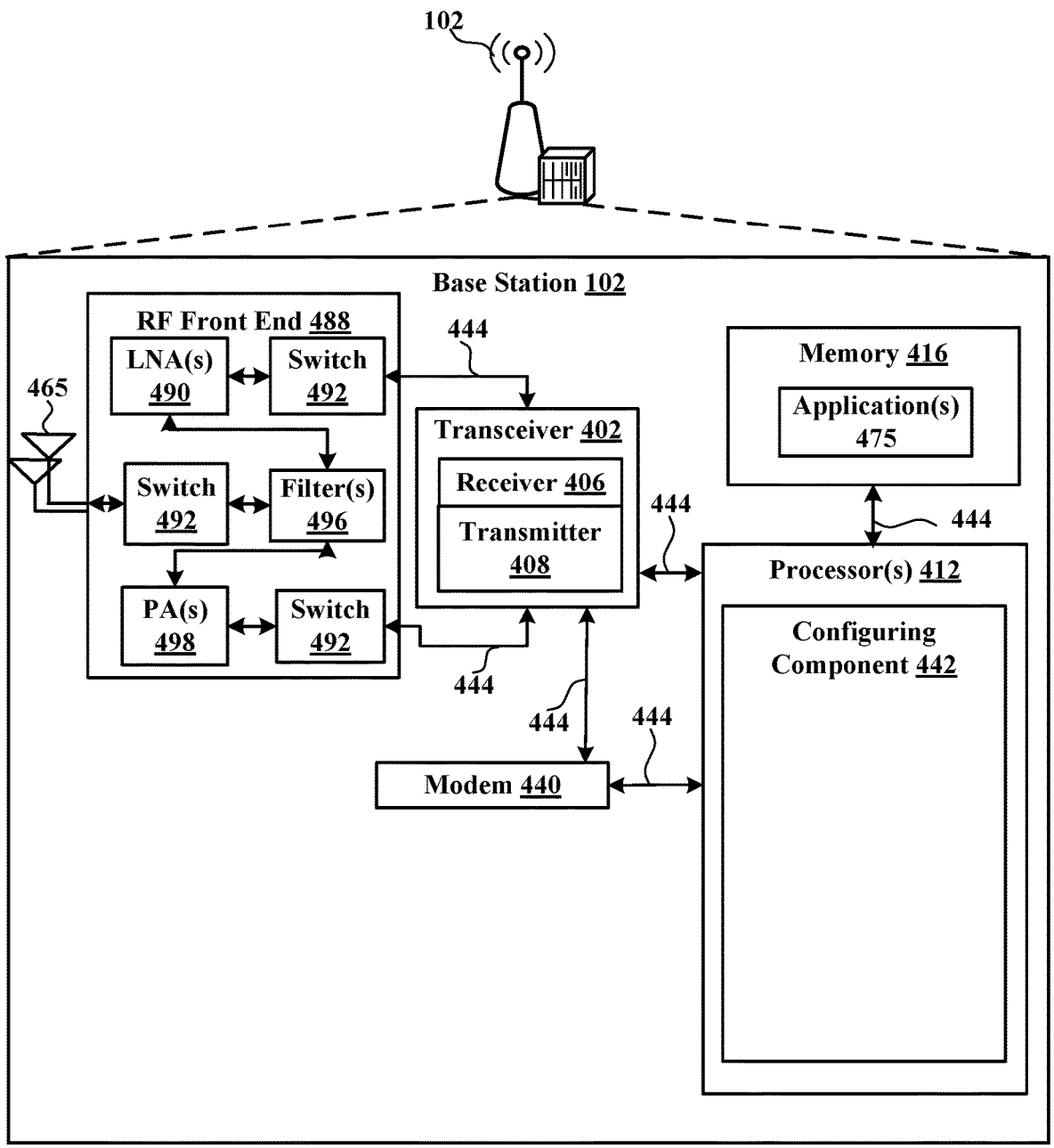
FIG. 4 is a block diagram illustrating an example of a base station, in accordance with various aspects of the present disclosure.

Referring to FIG. 4, one example of an implementation of base station 102 (e.g., a base station 102 and/or gNB 180, as described above), which may include a monolithic base station, disaggregated base station, or other network node, may include a variety of components, some of which have already been described above, but including components such as one or more processors 412 and memory 416 and transceiver 402 in communication via one or more buses 444, which may operate in conjunction with modem 440 and configuring component 442 for configuring UEs for communicating based on a fixed size TBS, as described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, the processor(s) 412 may correspond to one or more of the processors described in connection with the base station in FIG. 9. Similarly, the memory 416 may correspond to the memory described in connection with the base station in FIG. 9.

Figure 5:
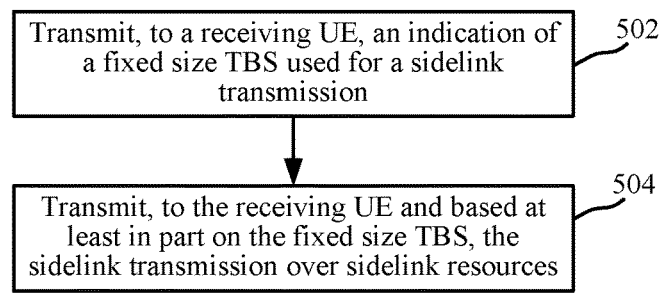
FIG. 5 is a flow chart illustrating an example of a method for transmitting communications according to a fixed size transport block size (TBS), in accordance with various aspects of the present disclosure.

FIG. 5 illustrates a flow chart of an example of a method 500 for transmitting communications according to a fixed size TBS. In an example, a UE (e.g., a sidelink transmitting UE 104-a) can perform the functions described in method 500 using one or more of the components described in FIGS. 1 and 3.

In method 500, at Block 502, an indication of a fixed size TBS used for a sidelink transmission can be transmitted to a receiving UE. In an aspect, TBS indicating component 352, e.g., in conjunction with processor(s) 312, memory 316, transceiver 302, UE communicating component 342, etc., can transmit, to the receiving UE (e.g., sidelink receiving UE 104-b), the indication of the fixed size TBS used for the sidelink transmission. For example, TBS indicating component 352 can use a fixed size TBS for certain communication, such as where the packet size of the sidelink transmission is pre-configured and/or determined to be within a range of packet sizes for the fixed size TBS. As described, using the fixed size TBS can avoid packet segmentation and/or zero padding in the sidelink transmission. In an example, TBS indicating component 352 can select the fixed size TBS for a given packet based on packet size. For example, the fixed size TBSs that can be used and/or the associated packet sizes can be configured at the UE 104-a, whether in memory 316 based on a wireless communication technology standard, configured by the base station 102 as described further herein, etc.

In one example, TBS indicating component 352 can indicate the fixed size TBS based on a determination to not use segmentation or padding for a TB. For example, an upper layer of the sidelink transmitting UE can determine not to segment or pad a TB based on packet delay, budget, priority, etc. In an example, the upper layer can include one or more layers that can encode the packet into TBs, an application layer, a packet data convergence protocol (PDCP) layer, etc.

In one example, in 5G NR using conventional TBS determination, a receiving sidelink UE can determine TBS and low-density parity-check (LDPC) base graph (BG) based on signaling, from the transmitting sidelink UE, of MCS and resource allocation (e.g., frequency domain resource allocation (FDRA) and time domain resource allocation (TDRA) in SCI-1). Thus, for example, using fixed size TBS instead can at least partially decouple the TBS calculation (including LDPC-BG selection) with MCS and FDRA/TDRA, and signaling from the sidelink transmitting UE may indicating one or more parameters regarding the LDPC-BG in addition to the TBS. In one example, fixed size TBS may be applied with a second LDPC-BG (e.g., LDPC-BG2) or as another configurable parameter. In one example, LDPC-BG2 may be applied for shorter TB length and/or lower code rate. In some examples, TBS indicating component 352 can also include, with the indication of the fixed size TBS, a LDPC-BG where applicable.

In one specific example, TBS indicating component 352 can transmit the indication of the fixed size TBS to the sidelink receiving UE in radio resource control (RRC) and/or media access control (MAC)-control element (CE). For example, the sidelink transmitting UE (e.g., UE 104-a) and the sidelink receiving UE (e.g., UE 104-b) may establish a RRC connection for a long-term connection in IIoT use cases (e.g., between IIoT UEs), as opposed to, for example, vehicle-to-vehicle communications, which may have a relatively short-term connection. In this example, TBS indicating component 352 may use RRC signaling (or MAC-CE) to configure one or more fixed size TBS for later packet reception.

In another example, TBS indicating component 352 can use MAC-CE in combination with RRC, such as by using RRC to indicate a set of fixed size TBSs, and using MAC-CE to activate a subset of the set of fixed size TBSs for later packet reception. In addition, as described for example, TBS indicating component 352 can configure the set of fixed size TBSs with corresponding LDPC-BG. In an example, if more than one fixed size TBS is configured, TBS indicating component 352 may use physical layer (PHY) signaling, such as SCI, for indicating the fixed size TBS used for the sidelink transmission. In addition, for example, if LDPC-BG is not configured for the fixed size TBS as indicated by other signaling, TBS indicating component 352 can use PHY signaling for indicating the LDPC-BG. In these examples, TBS indicating component 352 can transmit the RRC signaling with the set of fixed size TBSs, the MAC-CE indicating the subset of TBSs, the PHY signaling selecting one fixed size TBS where multiple are configured, the associated LDPC-BG(s), etc.

In method 500, at Block 504, the sidelink transmission can be transmitted to the receiving UE over the sidelink resources and based at least in part on the fixed size TBS. In an aspect, UE communicating component 342, e.g., in conjunction with processor(s) 312, memory 316, transceiver 302, etc., can transmit, to the receiving UE (e.g., sidelink receiving UE 104-b) and based at least in part on the fixed size TBS, the sidelink transmission over sidelink resources. For example, UE communicating component 342 can encode the packet into one or more TBs based on the fixed size TBS for transmission to the sidelink receiving UE, and can transmit the one or more encoded TBs to the sidelink receiving UE over the sidelink resources allocated for transmission, which may include PSSCH resources.

Figure 6:
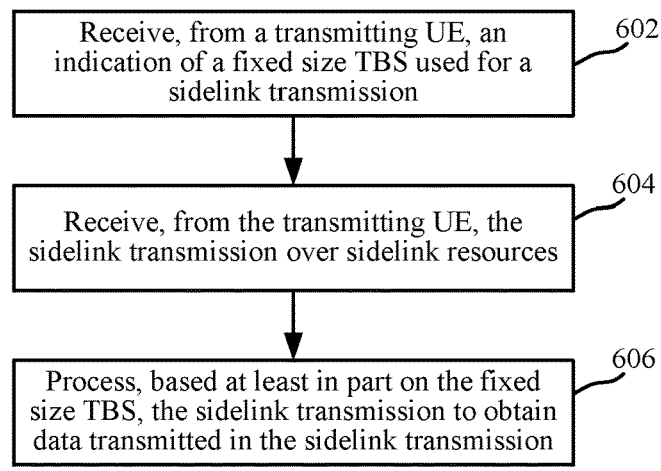
FIG. 6 is a flow chart illustrating an example of a method for receiving communications according to a fixed size TBS, in accordance with various aspects of the present disclosure.

FIG. 6 illustrates a flow chart of an example of a method 600 for receiving communications according to a fixed size TBS. In an example, a UE (e.g., a sidelink receiving UE 104-b) can perform the functions described in method 600 using one or more of the components described in FIGS. 1 and 3. Methods 500 and 600 are not required to be performed together and may be performed independently (on distinct devices or otherwise). Moreover, in some examples, a given UE 104 may be configured to perform one or both of methods 500 and/or 600 in a given scenario.

In method 600, at Block 602, an indication of a fixed size TBS used for a sidelink transmission may be received from a transmitting UE. In an aspect, TBS obtaining component 354, e.g., in conjunction with processor(s) 312, memory 316, transceiver 302, UE communicating component 342, etc., can receive, from the transmitting UE (e.g., sidelink transmitting UE 104-a), the indication of the fixed size TBS used for the sidelink transmission (e.g., to the sidelink receiving UE 104-*b*). For example, TBS obtaining component 354 can obtain the fixed size TBS from the transmitting UE using one or more of various possible signaling constructs described herein, and may use the fixed size TBS for receiving and/or processing or decoding a sidelink transmission received from the transmitting UE. In an example, TBS obtaining component 354 can obtain an indication of the fixed size TBS in the RRC signaling (or MAC-CE) from the sidelink transmitting UE. In another example, TBS obtaining component 354 can receive the RRC signaling with the set of fixed size TBSs, the MAC-CE indicating the subset of TBSs, the PHY signaling selecting one fixed size TBS where multiple are configured, the associated LDPC-BG(s), etc.

In method 600, at Block 604, the sidelink transmission can be received, from the transmitting UE, over sidelink resources. In an aspect, UE communicating component 342, e.g., in conjunction with processor(s) 312, memory 316, transceiver 302, etc., can receive, from the transmitting UE (e.g., sidelink transmitting UE 104-*a*), the sidelink transmission over sidelink resources. For example, UE communicating component 342 can receive the sidelink transmission as one or more TBs that are based on the TBS over the sidelink resources allocated for sidelink communications, which may include PSSCH resources.

In method 600, at Block 606, the sidelink transmission can be processed, based at least in part on the fixed size TBS, to obtain data transmitted in the sidelink transmission. In an aspect, UE communicating component 342, e.g., in conjunction with processor(s) 312, memory 316, transceiver 302, etc., can process, based at least in part on the fixed size TBS obtained by TBS obtaining component 354, the sidelink transmission to obtain data transmitted in the sidelink transmission. For example, UE communicating component 342 can use the fixed size TBS in decoding the TBs back to the packet transmitted by the sidelink transmitting UE.

Figure 7:
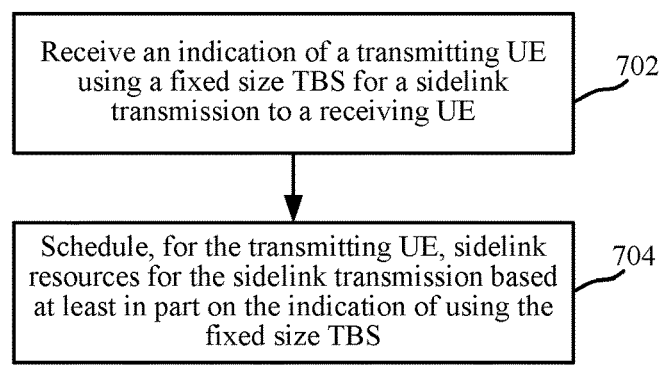
FIG. 7 is a flow chart illustrating an example of a method for allocating sidelink resources for fixed size TBSs, in accordance with various aspects of the present disclosure.

FIG. 7 illustrates a flow chart of an example of a method 700 for allocating sidelink resources for fixed size TBSs. In an example, a gNB (e.g., base station 102), or a disaggregated network node thereof, can perform the functions described in method 700 using one or more of the components described in FIGS. 1 and 4.

In method 700, at Block 702, an indication of a transmitting UE using a fixed size TBS for a sidelink transmission to a receiving UE may be received. In an aspect, configuring component 442, e.g., in conjunction with processor(s) 412, memory 416, transceiver 402, etc., can receive the indication of the transmitting UE (e.g., a sidelink transmitting UE 104-*a*) using the fixed size TBS for the sidelink transmission to the receiving UE (e.g., a sidelink receiving UE 104-*b*). For example, the indication can be received in a buffer status report (BSR) (e.g., BSR MAC-CE or RRC message) or other request for scheduling from the sidelink transmitting UE, as described. In addition, the indication may be a bit indication of whether the sidelink transmitting UE is using fixed size TBS (or whether the sidelink transmitting UE plans to segment or pad the packet for transmission), an indication of a size of the fixed size TBS (or one or more other fixed size TBSs the sidelink transmitting UE plans to use), etc.

In method 700, at Block 704, sidelink resources for the sidelink transmission can be scheduled for the transmitting UE based at least in part on the indication of using the fixed size TBS. In an aspect, configuring component 442, e.g., in conjunction with processor(s) 412, memory 416, transceiver 402, etc., can schedule, for the transmitting UE, sidelink resources for the sidelink transmission based at least in part on the indication of using the fixed size TBS. For example, configuring component 442 can configure the sidelink resources to be of a size sufficient for the fixed size TBS (e.g., using best effort to fit the fixed size TBS). The sidelink resources can correspond to PSSCH resources, PSCCH resources, a pool of resource from which the sidelink transmitting UE can select PSSCH or PSCCH resources, etc. In addition, scheduling the sidelink resources can include determining the allocation of resource (e.g., based on the fixed size TBS), generating parameters to indicate the allocation (e.g., generating a transmission over a control channel, such as a physical uplink control channel (PUCCH)), and transmitting the indication to the UE.

Figure 8:
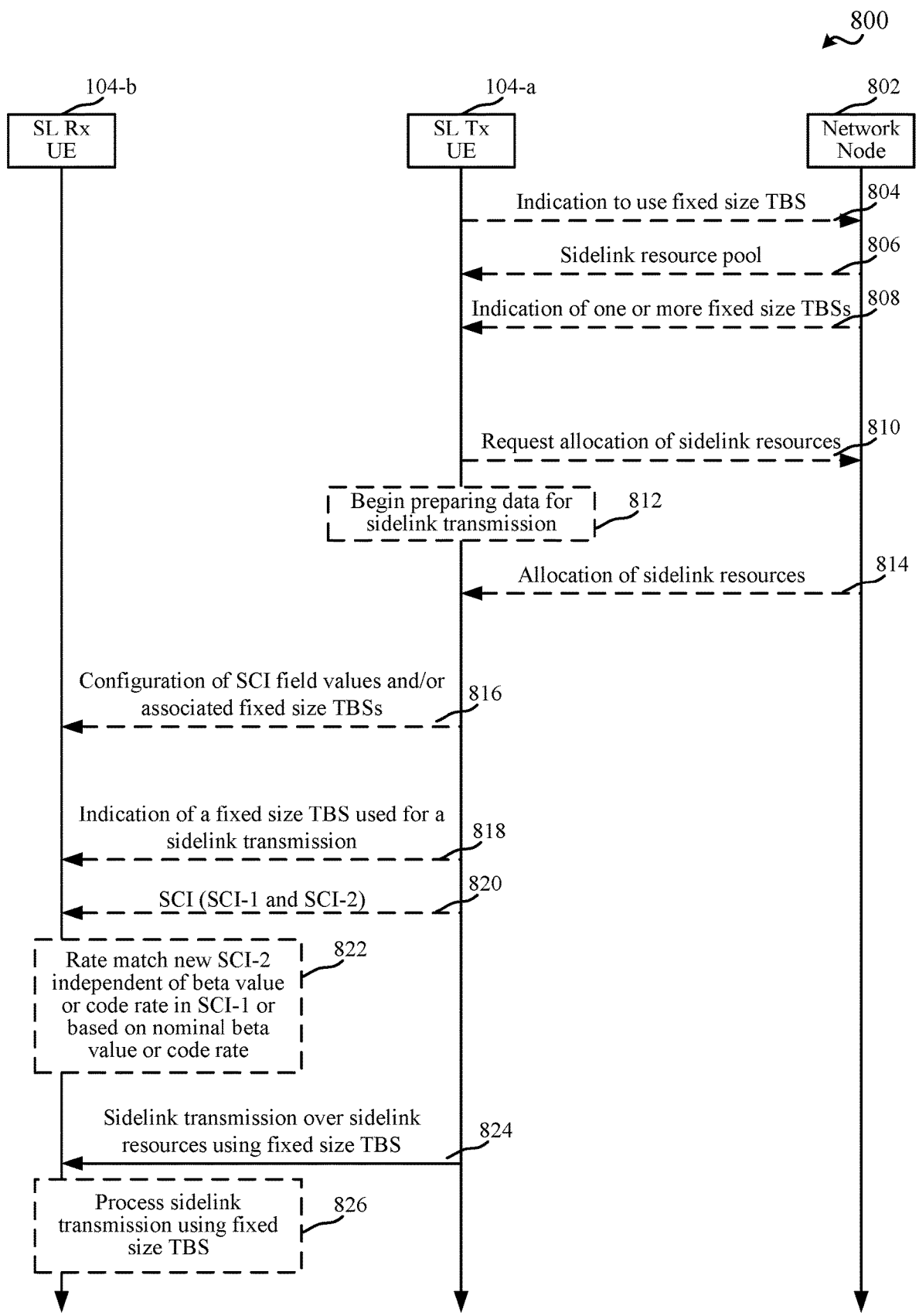
FIG. 8 illustrates an example of a call flow of communications between a sidelink (SL) transmitting (Tx) UE, a SL receiving (Rx) UE, and/or a network node.

FIG. 8 illustrates an example of a call flow 800 of communications between a sidelink (SL) transmitting (Tx) UE 104-*a*, a SL receiving (Rx) UE 104-*b*, and/or a network node 802, in accordance with some aspects described herein. In an example, network node 802 can include a base station 102, which may be a monolithic base station, a disaggregated base station, etc., a disaggregated portion of the base station, such as a CU, DU, or RU, and/or the like, as described above. In addition, various communications between the nodes are shown for illustrative purposes, but may not be required to perform the functions described herein, and in some examples, certain ones of the nodes may also not be required. For example, the SL Tx UE 104-*a* and SL Rx UE 104-*b* may communicate over sidelink without network node 802.

In an example, SL Tx UE 104-*a* may transmit, to the network node 802, an indication to use fixed size TBS at 804. For example, this may be for the purpose of receiving a resource allocation from the network node 802 that is compliant with the fixed size TBS, receiving an indication of supported fixed size TBS(s), etc. In an aspect, TBS indicating component 352, e.g., in conjunction with processor(s) 312, memory 316, transceiver 302, UE communicating component 342, etc., can transmit, to the network node 802, the indication to use the fixed size TBS. In an aspect, configuring component 442, e.g., in conjunction with processor(s) 412, memory 416, transceiver 402, etc., can receive, from the SL Tx UE 104-*a*, the indication to use the fixed size TBS. For example, TBS indicating component 352 can transmit the indication as a bit indicator of whether fixed size TBS is used (e.g., whether the UE is to segment or pad the packet or not), a fixed size TBS (or multiple fixed size TBSs or total of the sizes, etc.) the sidelink transmitting UE plans to use for sidelink communications, etc. In one example, TBS indicating component 352 can include the indication when transmitting a buffer status report (BSR) (e.g., in the BSR MAC-CE or RRC message).

In one example, where Mode 2 sidelink resource allocation is used for instance, the network node 802 can transmit a sidelink resource pool to the SL Tx UE 104-*a* at 806, which may be based at least in part on the indication to use fixed size TBS received from the SL Tx UE 104-*a* at 804. For example, the network node 802 may schedule the resource to fit the fixed size TBS. In an aspect, configuring component 442 can transmit, and/or UE communicating component 342 can receive, from the network node 802 and/or based at least in part on the indication, the pool of sidelink resources, or at least an indication of the pool of sidelink resources the SL Tx UE 104-*a* can use for sidelink transmissions using fixed size TBS.

In another example, the network node 802 may configure, to the SL Tx UE 104-*a* (which may be in response to the indication to use fixed size TBS or otherwise), one or more fixed size TBSs at 808, which can be used by the SL Tx UE 104-*a* when packet segmentation or padding is not expected or desired. In an aspect, UE communicating component 342, e.g., in conjunction with processor(s) 312, memory 316, transceiver 302, etc., can receive, from the base station, the indication of the one or more fixed size TBSs. In an aspect, configuring component 442, e.g., in conjunction with processor(s) 412, memory 416, transceiver 402, etc., can transmit, to the SL Tx UE 104-a, the indication of the one or more fixed size TBSs. For example, UE communicating component 342 can receive the indication in RRC signaling, MAC-CE, etc., and TBS indicating component 352 may select one of the fixed size TBSs configured by the network node 802 to indicate to the SL Rx UE 104-b, as described further herein.

In another example, which may be in addition or alternative to receiving the sidelink resource pool in Mode 2 described above, SL Tx UE 104-a can transmit a request for allocation of sidelink resources to the network node 802 at 810. For example, this may be part of Mode 1 resource allocation. In one example, SL Tx UE 104-a can transmit the request as part of a sidelink BSR, as described. For example, SL Tx UE 104-a can transmit a sidelink BSR to network node 802 to request allocation of sidelink resources from the network node 802. In an aspect, UE communicating component 342, e.g., in conjunction with processor(s) 312, memory 316, transceiver 302, etc., can transmit, to the network node 802, the sidelink BSR to request allocation of sidelink resources from the base station. In one example, the SL Tx UE 104-a can follow the legacy sidelink reporting procedure to request sidelink resources (e.g., transmitting BSR to the network node 802 to request sidelink resources in Mode 1 sidelink resource allocation).

In this example, the network node 802 can receive the request for allocation of sidelink resources, and can transmit (e.g., via configuring component 442), the allocation of sidelink resources to the SL Tx UE 104-a, where the allocation may be based on the fixed size TBS or otherwise. In an aspect, UE communicating component 342, e.g., in conjunction with processor(s) 312, memory 316, transceiver 302, etc., can receive, from the network node 802, the allocation of the sidelink resources. The SL Tx UE 104-a can receive the allocation of sidelink resources from the network node 802 in response to transmitting the BSR. In an example, UE communicating component 342 can receive the sidelink resource allocation in downlink control information (DCI) signaling over a downlink channel (e.g., physical downlink control channel (PDCCH), physical downlink shared channel (PDSCH), etc.), RRC (e.g., for configured grants), etc. In one example, based on receiving the allocation of sidelink resources or based on one or more parameters of the allocation or one or more parameters of the sidelink communications (e.g., a packet delay, budget, priority, etc., as described above), TBS indicating component 352 can determine to use fixed size TBS. For example, as described, TBS indicating component 352 can determine to use fixed size TBS for transmitting the sidelink communications where the packet is of a certain type, intended for a certain destination, etc., where the resource allocation is sufficient for the fixed size, etc.

In one example, the network node 802 can configure one or more TBSs to the SL Tx UE 104-a for fixed size TBS. In an aspect, configuring component 442, e.g., in conjunction with processor(s) 412, memory 416, transceiver 402, etc., can transmit, to the SL Tx UE 104-a, one or more TBSs for fixed size TBS. For example, configuring component 442 can configure the one or more TBSs for the transmitting sidelink UE to use for fixed size TBS sidelink transmission, where the configuring can be via RRC signaling, MAC-CE, etc.

In one example, where the TBS indicating component 352 determines to use fixed size TBS, or otherwise that no TB segmentation or padding is expected, as described, SL Tx UE 104-a can begin preparing data for sidelink transmission, at 812, before the allocation of sidelink resources is received at 814. This can optimize use of processing resources. For example, at the SL Tx UE 104-a, an upper layer may instruct the PHY layer to start PSSCH preparation before receiving the allocation of resources. For example, UE communicating component 342, from an upper layer such as an application layer, PDCP layer, etc., can instruct the PHY layer to start preparing the data for transmission before receiving the sidelink resource grant (e.g., PSSCH grant) from the base station 102. In an example, based on receiving the instruction, the PHY layer can begin cyclic redundancy check (CRC) computation, LDPC-BG selection, encoding, etc. for the data, as the TBS is configured based on selection by TBS indicating component 352.

In one example, at 816, the SL Tx UE 104-a can transmit, to the SL Rx UE 104-b, a configuration of multiple SCI field values and/or associated fixed size TBSs. In an aspect, UE communicating component 342, e.g., in conjunction with processor(s) 312, memory 316, transceiver 302, etc. of a SL Tx UE 104-a, can transmit, to the SL Rx UE 104-b, the configuration of multiple SCI field values and/or associated fixed size TBSs.

In the examples described above, SL Tx UE 104-a transmit the configuration in RRC signaling to include the nominal code rate, as described further herein. In an aspect, UE communicating component 342, e.g., in conjunction with processor(s) 312, memory 316, transceiver 302, etc. of the SL Rx UE 104-b, can receive, from the SL Tx UE 104-a, the configuration of SCI field values and/or associated fixed size TBSs. For example, SL Rx UE 104-b can receive the configuration in RRC signaling that includes the nominal code rate.

Optionally, at 818, the SL Tx UE 104-a can transmit, to the SL Rx UE 104-b, an indication of a fixed size TBS used for sidelink transmission, as described above. For example, TBS indicating component 352 can use a fixed size TBS for certain communication, such as where the packet size of the sidelink transmission is pre-configured and/or determined to be within a range of packet sizes for the fixed size TBS. As described, using the fixed size TBS can avoid packet segmentation and/or zero padding in the sidelink transmission. The SL Rx UE 104-b can receive the indication of the fixed size TBS used for the sidelink transmission, which can be used in processing the sidelink transmission.

In one example, SL Tx UE 104-a can transmit the indication of the fixed size TBS, at 818, as part of SCI. In another example, SL Tx UE 104-a can transmit the indication of the fixed size TBS, or at least a portion thereof, in separate signaling (e.g., in RRC signaling), and then can separately transmit SCI at 820. As described, in one specific example, SL Tx UE 104-b can configure multiple possible fixed size TBSs in RRC signaling (e.g., at 818), and can then select or activate one of the configured fixed size TBSs in SCI (e.g., at 820). Accordingly, in some examples, at 820, SL Tx UE 104-a can transmit SCI, which may be a multiple stage SCI including at least SCI-1 and SCI-2, to the SL Rx UE 104-b. For example, TBS indicating component 352 can indicate the fixed size TBS to use in SCI. For example, TBS indicating component 352 can indicate the fixed size TBS using newly-defined fields in SCI-2, which may provide backward compatibility for legacy UEs. For example, a SL Rx UE 104-b can decode SCI-2 based on content of SCI-1, such as FDRA, beta, MCS, and an SCI-2 format indication in SCI-1. The SL Tx UE 104-*a*, e.g., at 820, can indicate FDRA, beta, and code rate (which can be indicated in MCS) in SCI-1, and the SL Rx UE 104-*b* can calculate a number of resources (e.g., number of REs) used for SCI-2 based on these parameters. In an example, the SL Tx UE 104-*a* can indicate, and the SL Rx UE 104-*b* can use, SCI-2 format indication to interpret the payload of SCI-2. In an example, TBS indicating component 352 can use new SCI-2 formats, which may follow the legacy SCI-2 rate-matching, to indicate fixed size TBSs so that legacy UEs receiving the control transmissions from the sidelink transmitting UE may continue to decode both SCI-1 and SCI-2.

In an example, the new formats have bit fields indicating the fixed size TBS and LDPC BG of the PSSCH. In another example, the new formats may reserve a codepoint to indicate legacy TBS procedure where fixed size TBS is not used. In these examples, TBS indicating component 352 can indicate, using the new fields in SCI-2, the fixed size TBS and/or the LDPC-BG used for the sidelink transmission. The SL Rx UE 104-*b* can receive the SCI, and TBS obtaining component 354 can determine, from the new fields in SCI-2, the fixed size TBS and/or LDPC-BG used for the sidelink transmission. In an example, UE communicating component 342, at the SL Rx UE 104-*b*, can use the fixed size TBS, LDPC-BG, and modulation order (from MCS indication), as indicated in SCI-2, to decode PSSCH.

In another example, TBS indicating component 352 can use fields in SCI-1 to indicate fixed size TBS. For example, TBS indicating component 352 can indicate the FDRA, beta, MCS, and a SCI-2 format, using the fields in SCI-1 transmitted at 820. For example, the SL Rx UE 104-*b* can use FDRA, beta, and code rate (from MCS) to determine resources for SCI-2, however, modulation order (from MCS) may not be used or required to determine the resources for SCI-2. Modulation order, however, may be used or needed to perform PSSCH decoding. In this example, TBS indicating component 352 can indicate one or more parameters for a new rate matching for SCI-2, which may allow the beta and/or code rate in SCI-1 to be used to indicated fixed size TBS.

In one example, TBS indicating component 352 can use anew beta value to trigger the SCI-2 rate matching to allow the SCI-2 resources to be determined without using the code rate. For example, TBS indicating component 352 can configure the beta value using SCI-1 and a nominal code rate by RRC signaling to allow for determination of the SCI-2 resources, and then can use the code rate field in the MCS in SCI-1 to indicate the fixed size TBS. For example, bits of the code rate, in this regard, can be defined to indicate the size of the fixed size TBS. In this example, UE communicating component 342 of the SL Rx UE 104-*b* can rate match SCI-2 using the new rate matching that is based on the beta value indicated in SCI-1 and the nominal code rate indicated by RRC signaling, at 822, and TBS obtaining component 354 can obtain or determine the fixed size TBS from the value of the code rate field indicated in SCI-1.

In one example, transmitting the SCI at 820 can include transmitting SCI-2 using one or more of a nominal beta value or code rate configured for fixed size TBS. In an aspect, UE communicating component 342, e.g., in conjunction with processor(s) 312, memory 316, transceiver 302, etc. of the SL Tx UE 104-*a*, can transmit, to the SL Rx UE 104-*b*, SCI-2 using one or more of the nominal beta value or code rate configured for fixed size TBS. In the examples described above where the code rate field in SCI-1 is repurposed to indicate fixed size TBS, SL Tx UE 104-*a* can use the nominal code rate, which may be configured in RRC signaling to the SL Rx UE 104-*b*, in transmitting SCI-2, and SL Rx UE 104-*b* may perform rate matching new SCI-2 independent of a beta value or code rate indicated in SCI-1 or based at least in part on a nominal beta value or code rate at 822. In an aspect, UE communicating component 342, e.g., in conjunction with processor(s) 312, memory 316, transceiver 302, etc. of the SL Rx UE 104-*b*, can rate match the new SCI-2 independent of the beta value or code rate indicated in SCI-1 or based at least in part on the nominal beta value or code rate. In the examples described above where the code rate field in SCI-1 is repurposed to indicate fixed size TBS, SL Rx UE 104-*b* can rate match SCI-2 based on the nominal code rate.

In another example, TBS indicating component 352 can use a new SCI-2 format indication to trigger the new SCI-2 rate matching, such that the beta value and/or the code rate can be used to indicated fixed size TBS at 822. For example, SCI-1 can use two (or more) bits to indicate the SCI-2 format, and a certain codepoint for the multiple bit SCI-2 format can trigger the SCI-2 rate matching that is independent of beta value and code rate at 822. In one example, SL Tx UE 104-*a* can configure a nominal beta value and/or code rate for SCI-2 resource determination (e.g., using RRC signaling, as described). In this example, and as described above, UE communicating component 342 of SL Tx UE 104-*a* can transmit, to the SL Rx UE 104-*b*, SCI-2 using the nominal beta value and code rate configured for fixed size TBS (e.g., in RRC signaling), and then can use the beta value and/or the code rate in SCI-1 to indicate the fixed size TBS. In this example, and as described above, UE communicating component 342 of SL Rx UE 104-*b* can rate match the new SCI-2 independent of the beta value and code rate indicated in SCI-1, or based at least in part on the nominal beta value and code rate configured for fixed size TBS (e.g., received in the configuration in RRC signaling).

In another example, TBS indicating component 352 can use MCS to indicate the fixed size TBS. As described, MCS, as indicated in SCI-1, can define the combination of modulation order and code rate for the PSSCH. SL Tx UE 104-*a* may configure, via RRC signaling, MAC-CE, etc., a subset of MCS to be associated with the fixed size TBS. In an example, the remaining subset of MCS not indicated as configured for fixed size TBS may indicate to follow legacy TBS determination procedures. More generally, for example, a first subset of MCSs may be associated with a first fixed size TBS, a second subset of the MCSs may be associated with a second fixed size TBS, and a third subset of the MCSs may be associated with legacy TBS. Thus, in an example, a subset of MCSs associated with fixed TBS may be configured with one or more TBS, and in one example, TBS indicating component 352 can indicate the exact TBS from the subset using further PHY signaling (e.g., using new SCI-2 fields or formats, as described above). In this example, TBS obtaining component 354 of a sidelink receiving UE can determine the TBS based on the RRC configured subset for the MCS indicated in SCI-1 and/or based on the PHY signaling used to specify the TBS from the subset. In addition, in this example, UE communicating component 342 of SL Rx UE 104-*b* can perform rate-matching for SCI-2 using the nominal code rate, which may be RRC configured for the fixed TBS operations as described, or using the code rate indicated by the MCS at 822.

In an example, SL Tx UE 104-*a* can transmit the sidelink transmission to the SL Rx UE 104-*b* over sidelink resources using the fixed size TBS at 824, as described above. At 826, the SL Rx UE 104-*b* can process the sidelink transmission using, or otherwise based on, the fixed size TBS. For example, UE communicating component 342 of the SL Rx UE 104-*b* can use the fixed size TBS in decoding the TBs back to the packet transmitted by the sidelink transmitting UE.

Figure 9:
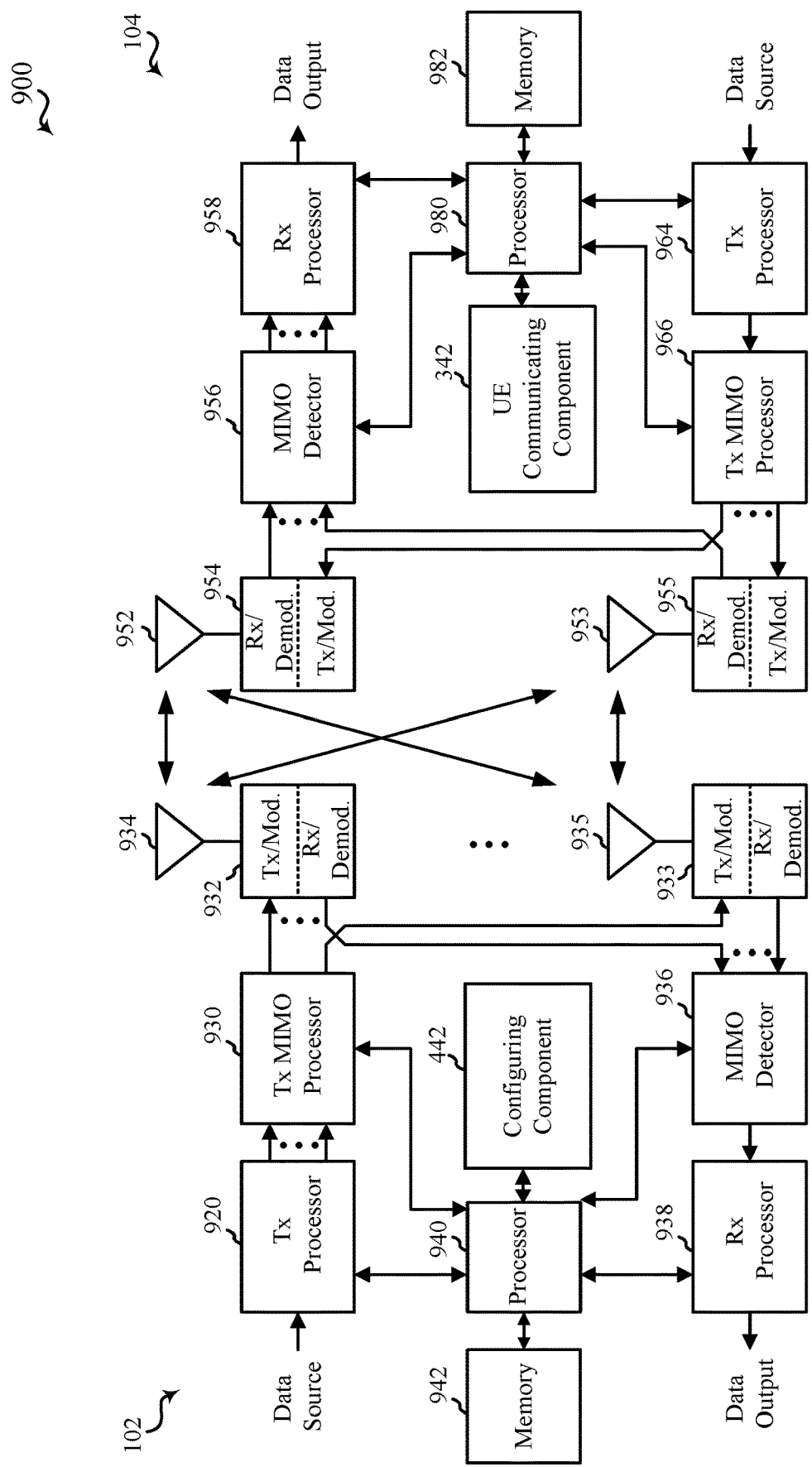
FIG. 9 is a block diagram illustrating an example of a MIMO communication system including a base station and a UE, in accordance with various aspects of the present disclosure.

FIG. 9 is a block diagram of a MIMO communication system 900 including a base station 102 and a UE 104, in accordance with various aspects of the present disclosure. The MIMO communication system 900 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications, and as such, base station 102 could be another UE 104 having a UE communicating component 342.

The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1-2. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a UE communicating component 342 (see e.g., FIGS. 1 and 3). In addition, in an example, UE 104 can be a sidelink transmitting UE, as described herein, and can use the components described herein to communicate with a sidelink receiving UE. In addition, in another example, UE 104 can be a sidelink receiving UE, as described herein, and can use the components described herein to communicate with a sidelink transmitting UE.

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a configuring component 442 (see e.g., FIGS. 1 and 4).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 900. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 900.

The following aspects are illustrative only and aspects thereof may be combined with aspects of other embodiments or teaching described herein, without limitation.

Aspect 1 is a method that includes transmitting, to a receiving UE, an indication of a fixed size TBS used for a sidelink transmission, and transmitting, to the receiving UE and based at least in part on the fixed size TBS, the sidelink transmission over sidelink resources.

In Aspect 2, the method of Aspect 1 includes where the indication of the fixed size TBS includes an indication of a LDPC BG.

In Aspect 3, the method of any of Aspects 1 or 2 includes transmitting, to a base station, a sidelink BSR to request allocation of the sidelink resources from the base station, and receiving, from the base station, the allocation of the sidelink resources, where transmitting the indication of the fixed size TBS is based at least in part on the allocation of the sidelink resources.

In Aspect 4, the method of Aspect 3 includes determining not to segment or pad data for the sidelink transmission based at least in part on the allocation of the sidelink resources, where transmitting the indication of the fixed size TBS is based at least in part on determining not to segment or pad the data for the sidelink transmission.

In Aspect 5, the method of Aspect 4 include where determining not to segment or pad the data for the sidelink transmission is further based at least in part on one or more of a packet delay budget or priority of the sidelink transmission.

In Aspect 6, the method of any of Aspects 3 to 5 includes instructing, by a first communication layer, a physical layer to begin preparing data for the sidelink transmission before receiving the allocation of sidelink resources.

In Aspect 7, the method of any of Aspects 1 to 6 includes transmitting, to a base station, an indication to use the fixed size TBS, and receiving, from the base station and based at least in part on the indication, a pool of sidelink resources, where transmitting the sidelink transmission is over a portion of sidelink resources in the pool of sidelink resources.

In Aspect 8, the method of any of Aspects 1 to 7 includes where transmitting the indication of the fixed size TBS includes transmitting, to the receiving UE, the indication of the fixed size TBS in RRC signaling or a MAC-CE.

In Aspect 9, the method of Aspect 8 includes where transmitting the indication of the fixed size TBS includes transmitting, to the receiving UE, a configuration of multiple fixed size TBSs in the RRC signaling, and transmitting, to the receiving UE, the MAC-CE to activate the fixed size TBS from the multiple fixed size TBSs.

In Aspect 10, the method of any of Aspects 8 or 9 includes where transmitting the indication of the fixed size TBS includes transmitting, to the receiving UE, a configuration of multiple fixed size TBSs in the RRC signaling or MAC-CE, and transmitting, to the receiving UE, physical layer signaling including an indication of the fixed size TBS from the multiple fixed size TBSs.

In Aspect 11, the method of any of Aspects 8 to 10 includes transmitting, to the receiving UE, an indication of a LDPC BG associated with the fixed size TBS.

In Aspect 12, the method of any of Aspects 1 to 11 includes where transmitting the indication of the fixed size TBS includes transmitting, to the receiving UE, a second stage sidelink control information that indicates the fixed size TBS.

In Aspect 13, the method of Aspect 12 includes where the second stage sidelink control information indicates a LDPC BG for the fixed size TBS.

In Aspect 14, the method of any of Aspects 1 to 12 includes where transmitting the indication of the fixed size TBS includes transmitting, to the receiving UE, a first stage sidelink control information indicating the fixed size TBS in a code rate field.

In Aspect 15, the method of Aspect 14 includes where a beta value field in the first stage sidelink control information indicates a nominal code rate to determine second sidelink control information resources.

In Aspect 16, the method of any of Aspects 1 to 15 includes where transmitting the indication of the fixed size TBS includes transmitting, to the receiving UE, a first stage sidelink control information including one or more bits indicating a new second sidelink control information format, and transmitting, to the receiving UE and based at least in part on the one or more bits, the new second sidelink control information indicating the fixed size TBS.

In Aspect 17, the method of any of Aspects 1 to 16 includes where transmitting the indication of the fixed size TBS includes transmitting, to the receiving UE, an indication of a MCS that is associated with the fixed size TBS.

In Aspect 18, the method of Aspect 17 includes transmitting, to the receiving UE, a configuration of multiple MCSs and associated fixed size TBSs, where at least a subset of the multiple MCSs are indicated as associated with computing a fixed size TBS.

In Aspect 19, the method of any of Aspects 17 or 18 includes transmitting, to the receiving UE, a configuration of multiple MCSs and associated fixed size TBSs, where transmitting the indication of the fixed size TBS includes transmitting, to the receiving UE, a physical layer signal indicating the fixed size TBS from multiple fixed size TBSs associated with the MCS.

In Aspect 20, the method of any of Aspects 17 to 19 includes transmitting, to a receiving UE, a second stage sidelink control information using one of a nominal code rate configured for fixed size TBS or a code rate of the MCS.

In Aspect 21, the method of any of Aspects 1 to 20 includes where the fixed size TBS is pre-configured independent of a resource allocation size and a MCS for the sidelink transmission.

Aspect 22 is a method including receiving, from a transmitting UE, an indication of a fixed size TBS used for a sidelink transmission, receiving, from the transmitting UE, the sidelink transmission over sidelink resources, and processing, based at least in part on the fixed size TBS, the sidelink transmission to obtain data transmitted in the sidelink transmission.

In Aspect 23, the method of Aspect 22 includes where the indication of the fixed size TBS includes an indication of a LDPC BG, and where processing the sidelink transmission is further based at least in part on the LDPC BG.

In Aspect 24, the method of any of Aspects 22 or 23 includes where receiving the indication of the fixed size TBS includes receiving, from the transmitting UE, the indication of the fixed size TBS in RRC signaling or a MAC-CE.

In Aspect 25, the method of Aspect 24 includes where receiving the indication of the fixed size TBS includes receiving, from the transmitting UE, a configuration of multiple fixed size TBSs in the RRC signaling, and receiving, from the transmitting UE, the MAC-CE to activate the fixed size TBS from the multiple fixed size TBSs.

In Aspect 26, the method of any of Aspects 24 or 25 includes where receiving the indication of the fixed size TBS includes receiving, from the transmitting UE, a configuration of multiple fixed size TBSs in the RRC signaling or MAC-CE, and receiving, from the transmitting UE, physical layer signaling including an indication of the fixed size TBS from the multiple fixed size TBSs.

In Aspect 27, the method of any of Aspects 24 to 26 includes receiving, from the transmitting UE, an indication of a LDPC BG associated with the fixed size TBS, where processing the sidelink transmission is further based at least in part on the LDPC BG.

In Aspect 28, the method of any of Aspects 22 to 27 includes where receiving the indication of the fixed size TBS includes receiving, from the transmitting UE, a second stage sidelink control information that indicates the fixed size TBS.

In Aspect 29, the method of Aspect 28 includes where the second stage sidelink control information indicates a LDPC BG for the fixed size TBS, where processing the sidelink transmission is further based at least in part on the LDPC BG.

In Aspect 30, the method of any of Aspects 22 to 29 includes where receiving the indication of the fixed size TBS includes receiving, from the transmitting UE, a first stage sidelink control information indicating the fixed size TBS in a code rate field.

In Aspect 31, the method of Aspect 30 includes where a beta value field in the first stage sidelink control information indicates a nominal code rate, and determining second sidelink control information resources based at least in part on the nominal code rate.

In Aspect 32, the method of any of Aspects 22 to 31 includes where receiving the indication of the fixed size TBS includes receiving, from the transmitting UE, a first stage sidelink control information including one or more bits indicating a new second sidelink control information format, and receiving, from the transmitting UE and based at least in part on the one or more bits, the new second sidelink control information indicating the fixed size TBS.

In Aspect 33, the method of Aspect 32 includes rate matching the new second sidelink control information independent of a beta and code rate indicated in the first stage sidelink control information or based at least in part on a nominal beta and code rate.

In Aspect 34, the method of any of Aspects 22 to 33 includes where receiving the indication of the fixed size TBS includes receiving, from the transmitting UE, an indication of a MCS that is associated with the fixed size TBS.

In Aspect 35, the method of Aspect 34 includes receiving, from the transmitting UE, a configuration of multiple MCSs and associated fixed size TBSs, where at least a subset of the multiple MCSs are indicated as associated with computing a fixed size TBS.

In Aspect 36, the method of any of Aspects 34 or 35 includes receiving, from the transmitting UE, a configuration of multiple MCSs and associated fixed size TBSs, where receiving the indication of the fixed size TBS includes receiving, from the transmitting UE, a physical layer signal indicating the fixed size TBS from multiple fixed size TBSs associated with the MCS.

In Aspect 37, the method of any of Aspects 34 to 36 includes receiving, from the transmitting UE, a second stage sidelink control information using one of a nominal code rate configured for fixed size TBS or a code rate of the MCS.

In Aspect 38, the method of any of Aspects 22 to 37 includes where the fixed size TBS is pre-configured independent of a resource allocation size and a MCS for the sidelink transmission.

Aspect 39 is a method including receiving an indication of a transmitting UE using a fixed size TBS for a sidelink transmission to a receiving UE, and scheduling, for the transmitting UE, sidelink resources for the sidelink transmission based at least in part on the indication of using the fixed size TBS.

In Aspect 40, the method of Aspect 39 includes where scheduling the sidelink resources includes determining a delay to a starting resource for the sidelink transmission based at least in part on the indication of using the fixed size TBS.

In Aspect 41, the method of any of Aspects 39 or 40 includes configuring, to the transmitting UE, one or more TBSs for fixed size TBS.

In Aspect 42, the method of any of Aspects 39 to 41 includes where the fixed size TBS is pre-configured independent of a resource allocation size and a MCS for the sidelink transmission.

Aspect 43 is an apparatus for wireless communication including a transceiver, a memory configured to store instructions, and one or more processors communicatively coupled with the memory and the transceiver, where the one or more processors are configured to execute the instructions to cause the apparatus to perform one or more of the methods of any of Aspects 1 to 42.

Aspect 44 is an apparatus for wireless communication including means for performing one or more of the methods of any of Aspects 1 to 42.

Aspect 45 is a computer-readable medium including code executable by one or more processors for wireless communications, the code including code for performing one or more of the methods of any of Aspects 1 to 42.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these.

Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus, comprising:
   a transceiver;
   a memory configured to store instructions; and
   one or more processors communicatively coupled with the memory and the transceiver, wherein the one or more processors are configured to:
      transmit, to a receiving user equipment (UE), an indication of a fixed size transport block size (TBS) used for a sidelink transmission, wherein the indication indicates a size of the fixed size TBS; and
      transmit, to the receiving UE and based at least in part on the fixed size TBS, the sidelink transmission over sidelink resources.

2. The apparatus of claim 1, wherein the indication of the fixed size TBS includes an indication of a low-density parity-check (LDPC) base graph (BG).

3. The apparatus of claim 1, wherein the one or more processors are further configured to:
   transmit, to a base station, a sidelink buffer status report (BSR) to request allocation of the sidelink resources from the base station; and
   receive, from the base station, the allocation of the sidelink resources,
   wherein the one or more processors are configured to transmit the indication of the fixed size TBS based at least in part on the allocation of the sidelink resources.

4. The apparatus of claim 3, wherein the one or more processors are further configured to:
   determine not to segment or pad data for the sidelink transmission based at least in part on the allocation of the sidelink resources,
   wherein the one or more processors are configured to transmit the indication of the fixed size TBS based at least in part on determining not to segment or pad the data for the sidelink transmission.

5. The apparatus of claim 4, wherein the one or more processors are configured to determine not to segment or pad the data for the sidelink transmission further based at least in part on one or more of a packet delay budget or priority of the sidelink transmission.

6. The apparatus of claim 3, wherein the one or more processors are further configured to:
   instruct, by a first communication layer, a physical layer to begin preparing data for the sidelink transmission before receiving the allocation of the sidelink resources.

7. The apparatus of claim 1, wherein the one or more processors are further configured to:
   transmit, to a base station, an indication to use the fixed size TBS; and
   receive, from the base station and based at least in part on the indication, a pool of sidelink resources,
   wherein the one or more processors are configured to transmit the sidelink transmission over a portion of sidelink resources in the pool of sidelink resources.

8. The apparatus of claim 1, wherein the one or more processors are configured to transmit the indication of the fixed size TBS at least in part by transmitting, to the receiving UE, the indication of the fixed size TBS in radio resource control (RRC) signaling or a media access control-control element (MAC-CE).

9. The apparatus of claim 8, wherein the one or more processors are configured to transmit the indication of the fixed size TBS at least in part by:
   transmitting, to the receiving UE, a configuration of multiple fixed size TBSs in the RRC signaling; and
   transmitting, to the receiving UE, the MAC-CE to activate the fixed size TBS from the multiple fixed size TBSs.

10. The apparatus of claim 8, wherein the one or more processors are configured to transmit the indication of the fixed size TBS at least in part by:
    transmitting, to the receiving UE, a configuration of multiple fixed size TBSs in the RRC signaling or MAC-CE, and
    transmitting, to the receiving UE, physical layer signaling including an indication of the fixed size TBS from the multiple fixed size TBSs.

11. The apparatus of claim 8, wherein the one or more processors are further configured to:
    transmit, to the receiving UE, an indication of a low-density parity-check (LDPC) base graph (BG) associated with the fixed size TBS.

12. The apparatus of claim 1, wherein the one or more processors are configured to transmit the indication of the fixed size TBS at least in part by transmitting, to the receiving UE, a second stage sidelink control information that indicates the fixed size TBS.

13. The apparatus of claim 12, wherein the second stage sidelink control information indicates a low-density parity-check (LDPC) base graph (BG) for the fixed size TBS.

14. The apparatus of claim 1, wherein the one or more processors are configured to transmit the indication of the fixed size TBS at least in part by transmitting, to the receiving UE, a first stage sidelink control information indicating the fixed size TBS in a code rate field.

15. The apparatus of claim 14, wherein a beta value field in the first stage sidelink control information indicates a nominal code rate to determine second sidelink control information resources.

16. The apparatus of claim 1, wherein the one or more processors are configured to transmit the indication of the fixed size TBS at least in part by:
transmitting, to the receiving UE, a first stage sidelink control information including one or more bits indicating a new second sidelink control information format; and
transmitting, to the receiving UE and based at least in part on the one or more bits, the new second sidelink control information indicating the fixed size TBS.

17. The apparatus of claim 1, wherein the one or more processors are configured to transmit the indication of the fixed size TBS at least in part by transmitting, to the receiving UE, an indication of a modulation and coding scheme (MCS) that is associated with the fixed size TBS.

18. The apparatus of claim 17, wherein the one or more processors are further configured to:
transmit, to the receiving UE, a configuration of multiple MCSs and associated fixed size TBSs, wherein at least a subset of the multiple MCSs are indicated as associated with computing a fixed size TBS.

19. The apparatus of claim 17, wherein the one or more processors are further configured to:
transmit, to the receiving UE, a configuration of multiple MCSs and associated fixed size TBSs,
wherein the one or more processors are configured to transmit the indication of the fixed size TBS at least in part by transmitting, to the receiving UE, a physical layer signal indicating the fixed size TBS from multiple fixed size TBSs associated with the MCS.

20. The apparatus of claim 17, wherein the one or more processors are further configured to:
transmit, to a receiving UE, a second stage sidelink control information using one of a nominal code rate configured for fixed size TBS or a code rate of the MCS.

21. The apparatus of claim 17, wherein the fixed size TBS is pre-configured independent of a resource allocation size and a modulation and coding scheme (MCS) for the sidelink transmission.

22. An apparatus, comprising:
a transceiver;
a memory configured to store instructions; and
one or more processors communicatively coupled with the memory and the transceiver, wherein the one or more processors are configured to:
receive, from a transmitting user equipment (UE), an indication of a fixed size transport block size (TBS) used for a sidelink transmission, wherein the indication indicates a size of the fixed size TBS;
receive, from the transmitting UE, the sidelink transmission over sidelink resources; and
process, based at least in part on the size of the fixed size TBS, the sidelink transmission to obtain data transmitted in the sidelink transmission.

23. The apparatus of claim 22, wherein the indication of the fixed size TBS includes an indication of a low-density parity-check (LDPC) base graph (BG), and wherein the one or more processors are configured to process the sidelink transmission further based at least in part on the LDPC BG.

24. The apparatus of claim 22, wherein the one or more processors are configured to receive the indication of the fixed size TBS at least in part by receiving, from the transmitting UE, the indication of the fixed size TBS in radio resource control (RRC) signaling or a media access control-control element (MAC-CE).

25. The apparatus of claim 24, wherein the one or more processors are configured to receive the indication of the fixed size TBS at least in part by:
receiving, from the transmitting UE, a configuration of multiple fixed size TBSs in the RRC signaling; and
receiving, from the transmitting UE, the MAC-CE to activate the fixed size TBS from the multiple fixed size TBSs.

26. The apparatus of claim 24, wherein the one or more processors are configured to receive the indication of the fixed size TBS at least in part by:
receiving, from the transmitting UE, a configuration of multiple fixed size TBSs in the RRC signaling or MAC-CE, and
receiving, from the transmitting UE, physical layer signaling including an indication of the fixed size TBS from the multiple fixed size TBSs.

27. The apparatus of claim 24, wherein the one or more processors are further configured to receive, from the transmitting UE, an indication of a low-density parity-check (LDPC) base graph (BG) associated with the fixed size TBS, wherein the one or more processors are configured to process the sidelink transmission further based at least in part on the LDPC BG.

28. The apparatus of claim 22, wherein the one or more processors are configured to receive the indication of the fixed size TBS at least in part by receiving, from the transmitting UE, a second stage sidelink control information that indicates the fixed size TBS.

29. An apparatus, comprising:
a transceiver;
a memory configured to store instructions; and
one or more processors communicatively coupled with the memory and the transceiver, wherein the one or more processors are configured to:
receive an indication of a transmitting user equipment (UE) using a fixed size transport block size (TBS) for a sidelink transmission to a receiving UE, wherein the indication indicates a size of the fixed size TBS; and
schedule, for the transmitting UE, sidelink resources for the sidelink transmission based at least in part on the indication of using the fixed size TBS.

30. The apparatus of claim 29, wherein the one or more processors are configured to schedule the sidelink resources at least in part by determining a delay to a starting resource for the sidelink transmission based at least in part on the indication of using the fixed size TBS.

* * * * *